United States Patent [19]

Huynh-Ba

[11] Patent Number: 5,004,784

[45] Date of Patent: Apr. 2, 1991

[54] POLYMER BLENDS CONTAINING ISOCYANATE REACTING AGENTS

[75] Inventor: Gia Huynh-Ba, Hockessin, Del.

[73] Assignee: E. I. du Pont de Nemours and Company, Wilmington, Del.

[21] Appl. No.: 177,663

[22] Filed: Apr. 5, 1988

[51] Int. Cl.$^5$ .................... C08L 23/00; C08L 59/00; C08L 67/02; C08L 77/00
[52] U.S. Cl. .................................. 525/123; 525/131; 525/399; 525/424; 525/440; 525/931
[58] Field of Search ............... 525/440, 399, 424, 123, 525/131

[56] References Cited

U.S. PATENT DOCUMENTS

| | | | |
|---|---|---|---|
| 3,697,624 | 10/1972 | Braunstein | 260/860 |
| 4,409,167 | 10/1983 | Kolouch et al. | 264/102 |
| 4,463,156 | 7/1984 | McGary et al. | 528/65 |
| 4,550,148 | 10/1985 | Droescher et al. | 525/440 |
| 4,661,546 | 4/1987 | Abu-Isa et al. | 524/153 |

FOREIGN PATENT DOCUMENTS

| | | |
|---|---|---|
| 0056293 | 7/1982 | European Pat. Off. . |
| 1594502 | 2/1978 | United Kingdom . |
| 1208585 | 12/1987 | United Kingdom . |

OTHER PUBLICATIONS

Defensive Publ. T908,011, published Mar. 27, 1973, Author: Witsiepe, Title: Polyisocyanate Modified Thermoplastic Polyester Compositions.

Primary Examiner—Ana L. Carrillo

[57] ABSTRACT

A composition of improved strength, stiffness, or toughness consisting essentially of a blend of at least two incompatible thermoplastic polymers, at least one of which has a flexural modulus of less than 150 kpsi, and at least one isocyanate reacting agent having functionality less than three. The composition, an engineering plastic that is impact resistant, is useful as, for example, a molding resin, an automobile bumper or door, or high pressure tubing.

40 Claims, No Drawings

POLYMER BLENDS CONTAINING ISOCYANATE REACTING AGENTS

TECHNICAL FIELD

This invention relates to certain blends of at least two incompatible thermoplastic polymers which blends are characterized as having improved toughness, stiffness, and/or strength. More specifically, the blends of the invention contain at least two incompatible polymers, each of which has a number average molecular weight of 10,000 or greater and each of which is mono-, di-, or multi-functional, with said functionality being hydroxy, anhydride, carboxy, epoxy, or amino groups. The at least two incompatible polymers are blended together with an isocyanate reacting agent having functionality less than three.

Polymer blends containing isocyanates are known. However, the polymers used in such blends were compatible with each other or such blends further contained a compatibilizing polymer. Furthermore, the resulting polymer blends did not have the same chemical (e.g., solubility, toxicity, etc.) and mechanical (e.g. tensile, flexural, etc.) properties as did the individual starting polymeric components. For example, when a polymer possessing high stiffness values (e.g., flexural modulus, tensile modulus) was blended with one exhibiting high toughness values (e.g. notched Izod, tensile elongation), the final blend would not possess the strength, stiffness, or toughness properties of the individual polymers in the blend, but rather would possess such properties at or below the proportionate average of those of the polymeric components in the blend. In contrast, the blends of the present invention have improved strength, stiffness, and/or toughness properties as compared with the proportionate average of these properties for the individual components.

The compositions of the present invention are useful as engineering plastics where impact resistance is needed. As examples, the compositions can be used as molding resins, automobile bumpers, automobile doors, or high pressure tubing.

BACKGROUND ART

U.S. Pat. No. 4,550,148, granted Oct. 29, 1985 to Droescher, discloses molding compositions of polyalkylene terephthalate, isocyanate with functionality of 3-7, and optionally, other polymers conventional in polyester technology, such as polyamides, polyetherester amides, polyether esters, and functionalized ethylene/propylene/diene/copolymer (EPDM). The functionality of the isocyanate disclosed in this reference is beyond the literal scope of the isocyanate claimed in the present invention.

U.S. Pat. No. 4,409,167, granted Oct. 11, 1983 to Kolouch et al., discloses a process for extruding polymeric blends consisting of poly(ethylene terephthalate) resin with an incompatible polymer that is made compatible to the poly(ethylene terephthalate) resin through the use of a compatibilizing agent, such as carboxyl- or ester-containing polymers. Organic diisocyanates are used only to increase the melt viscosity of the composition. The present invention eliminates the requirement that a compatibilizing polymer be used when an incompatible polymer is blended with poly(ethylene terephthalate).

U.S. Defensive Publication T-908,011, published Mar. 27, 1973 by Witsiepe, discloses a modified polyester composition prepared by mixing copolyester polymer with a polyisocyanate. The polyisocyanate is used to increase the number average molecular weight of the polyester composition. There is no mention in the reference of a blend of incompatible polymers.

U.S. Pat. No. 3,697,624, granted Oct. 10, 1974 to Braunstein, discloses a modified oxymethylene polymer prepared by the coupling reaction of an oxymethylene polymer (acetal polymer) and polybutylene terephthalate with an isocyanate. This is a blend of two hard polymers (i.e., polymers having flexural modulus greater than 150 kpsi).

While the above references all disclose blends consisting at least of a polyalkylene terephthalate and an isocyanate, none disclose the particular claimed blends of the present invention nor do any recognize the improved results obtained with such blends.

DISCLOSURE OF THE INVENTION

This invention relates to certain thermoplastic compositions which are blends of two or more incompatible thermoplastic polymers, which compositions are characterized as having improved strength, stiffness, and/or toughness properties. For purposes of defining the present invention, these properties are measured as follows: (1) stiffness is measured by tensile modulus or flexural modulus; (2) strength is measured by tensile strength at maximum or flexural strength; and (3) toughness is measured by notched izod, tensile elongation at break, or fast tear strength. The compositions of the present invention consist essentially of a blend of at least two incompatible polymers, each of which has at least one functional group of a certain specific type attached thereto, and a reacting agent. At least one of the incompatible polymers must have a flexural modulus less than 150 kpsi.

Polymeric blends are well known in the art. It is generally known that two compatible polymers can be blended together and that two incompatible polymers can be blended together, provided a compatibilizing polymer is employed. Generally, in polymeric blends, there is an inverse relationship between toughness properties and stiffness or strength properties. For example, a blend that has high toughness usually does not have high flexural modulus (stiffness measurement). In the present invention, two incompatible polymers are blended without the use of a compatibilizing polymer. Furthermore, in the present invention, through the use of a reacting agent, a blend of incompatible polymers is achieved in which the properties of the individual components are synergistically combined to create a blend of superior quality, one in which strength, stiffness, and toughness properties are maintained while at least one of those properties is improved.

Specifically, this invention consists essentially of an at least three component blend of (a) 0-95 weight percent of at least one thermoplastic polymer with a minimum number average molecular weight of 10,000 and a flexural modulus of greater than 150 kpsi, which has at least one functional group capable of reacting with an isocyanate group or which is end capped with groups that can be removed between the melting point or glass transition temperature of the polymer and the decomposition point of the polymer to expose said at least one functional group;

(b) 100–5 weight percent of at least one thermoplastic polymer with a minimum number average molecular weight of 10,000 and a flexural modulus of less than 150 kpsi, which has at least one functional group capable of reacting with an isocyanate group or which is endcapped with groups that can be removed between the melting point or glass transition temperature of the polymer and the decomposition point of the polymer to expose said at least one functional group, provided that when component (b) is present at greater than 95%, component (b) consists of at least two polymers that are incompatible with each other; and (c) 0.3-5 weight percent, based on the weight of (a) and (b) above, of at least one isocyanate reacting agent with functionality less than three or any compound or precursor of isocyanate that at processing temperature during melt blending is transformed into a compound with isocyanate functionality less than three; provided further that in a blend of component (a) with component (b), component (a) and (b) are incompatible with each other, and further provided that in all blends there be at least 5 weight percent of component (a) or component (b) that is incompatible with at least one other polymer in the blend. Said at least one functional group includes the following functional groups: hydroxy, anhydride, carboxy, epoxy, amino, and thiol. Preferred functional groups include hydroxy, anhydride, carboxy, epoxy, or amino groups. The functional group may be attached anywhere on the polymer, but preferably, it is attached on the end of the polymer.

For purposes of defining the present invention, incompatibility occurs when one polymer is not dispersed in the other polymer at the molecular level. This is measured by Transmission Electron Microscopy (TEM). In order to determine incompatibility in polymer blends using TEM, samples are prepared by subjecting a molded or extruded part to ultramicrotomy so as to produce a suitably thin slice for testing. The temperature at which the sample is microtomed is dependent upon the properties of the sample blend. If all components of the blend have a glass transition temperature well above room temperature (for example, 80° C.), the sample can be cut at ambient temperature. If the sample blend contains components that are rubbery at room temperature, the sample must be sectioned on a cryoultramicrotome at a temperature that is at least 10° C. below the glass transition temperature of the rubbery material. If the sample blend contains one or more semicrystalline polymer, such as polyethylene, which melts above room temperature but has a glass transition temperature below room temperature, the sample must be microtomed at cryogenic temperatures, which are −60° to −120° C. All samples are cut using diamond knives. For plastics, sectioning is normally performed perpendicular to a known flow direction. Since layered structures may result from certain types of mixing, it is prudent to cut the samples with more than one orientation in relation to the processing direction (e.g., parallel and perpendicular to the flow direction) when regions of different composition are of interest. The section thickness, for ultramicrotomy, is generally 30-100 nanometers, while for cryoultramicrotomy, it is generally near the high end of the range, e.g., 90 nanometers.

In the samples, incompatibility is witnessed when there is a contrast due to density differences. If intrinsic contrast due to density differences in the sample is lacking, a specific stain for one component may be necessary. Staining conditions that are selected depend upon the specific combination of polymers in the blend and the functional group to be stained. Staining must be done by one skilled in the art of polymer microscopy as it is possible that contrast can be reduced or eliminated when staining is used indiscriminately. It is noted that staining may not be necessary, even when the sample lacks density differences, if the polymers in the blend differ substantially in their sensitivity to electron beams. For example, chain scission followed by unzipping can cause selective degradation in a polymeric phase and produce excellent image contrast, even in a blend of polymers with initially equal densities.

The images from the samples are observed and recorded on a JEOL 2000 FX transmission electron microscope at an accelerating voltage range of 80 to 200 KV, usually 120 KV. Any other transmission electron microscope which has been aligned according to manufacturer's instructions and has passed the most common resolution test for such an instrument, i.e., photographic recovering of the 0.34 nm lattice fringes in graphitized carbon, should be able to produce comparable images at similar accelerating voltage. Images are recorded on Kodak 4489 or SO-163 electron image film or any other suitable film. Contrast will clearly be seen, in most incompatible blends, at a magnification of 10,000 X, although contrast can be seen in the range of 2,000 to 25,000 X. Generally, between 5 and 10 different sample areas are recorded.

Incompatibility is determined via visual inspection of a properly exposed negative or print. A sample is considered to contain incompatible components or polymers when the sample area observed has regions of differing contrast, said regions being at least 25 nanometers in their smallest dimension (or breadth).

Component (a) thermoplastic polymer comprises 0-95 weight percent, preferably 5-95 weight percent, more preferably 50-90 weight percent, and most preferably 65-80 weight percent of the blend. Component (b) at least one thermoplastic polymer comprises 100-5 weight percent, preferably 95-5 weight percent, more preferably 50-10 weight percent, and most preferably 35-20 weight percent of the blend, provided that at greater than 95 weight percent, component (b) is present as a mix or blend of at least two incompatible component (b) type polymers. Component (c) at least one isocyanate compound comprises 0.3-5 weight percent, preferably 0.5-3 weight percent, and most preferably 0.75 to 2 weight percent, said weight percent being based upon the total weight of component (a) and component (b).

Component (a) thermoplastic polymer has a minimum number average molecular weight of 10,000 and usually does not have a glass transition temperature less than 0° C. The flexural modulus of component (a) is greater than 150 kpsi, preferably greater than 200 kpsi, and most preferably greater than 250 kpsi. Examples of such thermoplastic polymers include, but are not limited to, polyalkylene terephthalates, polyacetals, and polyamides.

Polyalkylene terephthalates are produced by conventional methods, such as those described in the Journal of Polymer Science, Part A1, Book 4, pp. 1851-1859 (1966), from the reaction of a terephthalic acid or a dialkyl ester of terephthalic acid with a diol. The preferred number average molecular weight range of the polyalkylene terephthalate is 20,000 to 25,000. Preferred polyalkylene terephthalates are polyethylene terephthalate and polybutylene terephthalate.

Polyacetals include homopolymers of formaldehyde or of cyclic oligomers of formaldehyde, the terminal groups of which are end-capped by esterification or etherification, and co-polymers of formaldehyde or cyclic oligomers of formaldehyde with oxyalkylene groups with at least two adjacent carbon atoms in the main chain, the terminal groups of which copolymers can be hydroxyl terminated or can be end-capped for esterification or etherification. The preferred number average molecular weight range of the polyacetal is 20,000–100,000, more preferred 30,000–80,000. Preferred polyacetal is acetal homopolymer end-capped with acetate. Polyacetals can be prepared according to the disclosures in U.S. Pat. Nos. 2,998,409 and 2,768,994.

Polyamides embrace those semi-crystalline and amorphous resins commonly referred to as nylons. Suitable polyamides include those disclosed in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (6,6 nylon), polyhexamethylene azelaamide (6,9 nylon), polyhexamethylene sebacamide (6,10 nylon), polyhexamethylene dodecanoamide (6,12 nylon), the polyamide producing by ring opening of lactams, i.e., polycaprolactam (nylon 6), polylauric lactam, poly-11-aminoundecanoic acid, and bis(paraaminocyclohexyl) methane dodecanoamide. It is also possible to use polyamides prepared by the copolymerization of two of the above polymers or terpolymerization of the above polymers or their components, as, for example, an adipic, isophthalic acid hexamethylene diamine copolymer. Preferred polyamides are nylon 6,6 and nylon 6.

Component (b), above, has a minimum number average molecular weight of 10,000, and a glass transition temperature usually less than 0° C. The flexural modulus of component (b) is less than 150 kpsi, preferably less than 100 kpsi, and most preferably less than 60 kpsi. Examples of such thermoplastic polymers include polyesters, particularly copolyetheresters and polyesterimides, and ethylene copolymers.

Suitable copolyetheresters include those disclosed in U.S. Pat. Nos. 3,651,014; 3,763,019; 3,766,146; and 4,185,003. More specifically, these copolyetheresters consist essentially of a multiplicity of recurring long chain ester units and short chain ester units joined head-to-head through ester linkages, said long chain ester units being represented by the formula

and said short chain ester units being represented by the formula

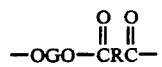

where G is a divalent radical remaining after the removal of terminal hydroxyl groups from a poly(alkylene oxide) glycol having a number average molecular weight of greater than 400 and a carbon to oxygen atomic ratio of about 2.0–4.3, R is a divalent radical remaining after removal of carboxyl groups from an aromatic dicarboxylic acid having a number average molecular weight of less than about 300, and D is a divalent radical remaining after removal of hydroxyl groups from a diol having a number average molecular weight less than about 250; provided said short chain ester units amount to about 15–95 percent, preferably 20–75 percent, by weight of said copolyetherester.

Suitable polyesterimides include those types disclosed in U.S. Pat. No. 4,731,435. More specifically, these polyesterimides are elastomers characterized in that the elastomer consists essentially of (a) from about 10 to 30, preferably 15–25, weight percent of an imide acid of the following repeating structure

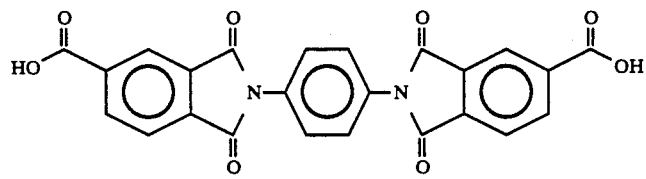

and (b) 70 to 90, preferably 75–85, weight percent of a diacid/alcohol unit, said unit comprised of (1) a diacid of the structure

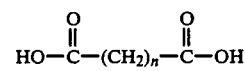

where n is greater than 2 but less than 10, preferably greater than 3 but less than 9 and (2) alcohols of the following group:
(a) diethylene glycol,
(b) 1,4-butanediol; 1,6-hexanediol,
and (c) ethylene glycol wherein the total number of moles of the alcohols is equal to the number of moles of the imide acid plus the number of moles of the diacid. Furthermore, for that portion of the diacid/alcohol unit attributable solely to alcohol units, diethylene glycol comprises 0–90 weight percent, 1,4-butanediol and 1,6-hexanediol comprises 0–60 weight percent, and ethylene glycol comprises 10–80 weight percent of the total alcohol content. Preferred polyesterimide compositions consist essentially of 15–25 weight percent of the imide acid and 85–75 weight percent of the diacid/alcohol unit said unit being comprised of 0–30 weight percent diethylene glycol, 0–30 weight percent 1,4-butanediol and/or 1,6-hexanediol, 10–15 weight percent ethylene glycol, and 35–60 weight percent diacid where n is greater than 2 but less than 9.

Suitable ethylene co-polymers include those types disclosed in International Publication No. WO 85/03718, published Aug. 29, 1985. More specifically, the ethylene copolymer is a copolymer of the formula E/X/Y where E is the radical formed from ethylene and comprises 40–90 weight percent of the ethylene copolymer, X is the radical formed from

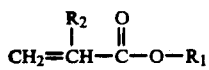

where $R_1$ is an alkyl group with 2–8 carbon atoms, preferably 4–6 carbon atoms, and most preferably 4 carbon atoms and $R_2$ is H, $CH_3$ or $C_2H_5$, preferably H or $CH_3$, and most preferably H, and X comprises 10–40 weight percent, preferably 15–35 weight percent, and most preferably 20–35 weight percent of ethylene copolymer, and Y is selected from the group consisting of glycidyl methacrylate and glycidyl acrylate and Y comprises 0.5–20 weight percent, preferably 2.0–10 weight percent, most preferably 1–6 weight percent of the ethylene copolymer.

Component (c), the isocyanate reacting agent, is an isocyanate with functionality of less than three or is any precursor that at processing temperature during melt blending is converted into an isocyanate with functionality less than three. It can further be aliphatic or aromatic in nature. Examples of such isocyanates include, but are not limited to methylenediphenylene di-isocyanate (MDI), 2,4-toluene or 2,6-toluene di-isocyanate (TDI), isophorone, aliphatic di-isocyanate derived from $C_1$–$C_{12}$, and naphthalene di-isocyanate. The dimer of di-isocyanate is an example of such a "precursor". Preferred isocyanates are MDI and TDI.

Fillers such as glass fiber, mineral, antioxidant, UV or heat stabilizer, processing aids, or inert polymer can be incorporated within the blend during manufacture as well as into the finished and treated product.

Process

The polymer blend of the present invention can be produced by mixing the starting polymers together, at approximately 25°–50° C., with the isocyanate compound and then subjecting the mixture to melt mixing. It can also be prepared by mixing the starting polymers together at 25°–50° C., then subjecting the mixture to melt mixing, and then adding the isocyanate compound to the mixture during melt mixing.

Melt mixing can be carried out in any of the polymer melt mixing devices that are known to those skilled in the art as being capable of generating sufficient heat and shear to melt and adequately mix the starting materials. For example, the polymer can be melt mixed in an internal mixer, in a single screw extruder, or preferably, in a twin screw extruder. The barrel temperature should be set at the temperature at which the polymers melt, generally 190° to 280° C. To remove any excess isocyanate in the polymer blend, it is useful to have a vacuum port just prior to the exit die. At the vacuum port, the temperature should be at least 190° C., usually 240° C. or higher, provided the polymer blend does not decompose at such temperature. Once the isocyanate compound is added, the melt mixing procedure should last long enough such that the blend, as it exits the melt mixing device, contains no unreacted isocyanate compound. Longer residence time will be required for melt mixing at lower temperatures than will be required for melt mixing at higher temperatures. Residence time is normally between 0.5 and 3 minutes, depending upon the particular polymer chosen. If a melt mixing temperature of less than 190° C. is chosen, then, to insure that no unreacted isocyanate compound is in the polymer blend, there must be no excess isocyanate compound used in preparing the blend.

Blending in a single screw extruder is accomplished by feeding a physical mixture of the components to be blended into an extruder which has been fitted with a screw that develops sufficient energy to melt and mix the components. The screw may be of a single-stage design or of a two-stage design for use with a vented barrel so as to remove any volatile component derived from the reaction or the degradation of the isocyanate. The barrel temperature settings would be selected to provide the desired melt temperature, generally 190°–280° C., and a screw speed selected within the normal operating range of the machine, usually near the upper end of the range. The product exits the die and is normally pelletized if it is to be remelted in a subsequent step.

The compositions of this invention may also be compounded in a twin-screw extruder. The machines made by the Werner and Pfleiderer Company are examples of suitable twin-screw machines. These machines employ two intermeshing co-rotating screws which are assembled from various elements into a suitable configuration. The selection of a screw configuration is not critical to the invention. A typical configuration will be conveying elements to convey the feed material from the feed zone to a melting zone in which the material is compressed and melting begins. A section of "kneading blocks" followed by "reverse elements" next provides high shear and pressure to further the melting and mixing processes, which permit the various reactions to begin. If the extrusion is to be conducted under vacuum, the reverse elements serve also to provide a melt seal following which the melt will be decompressed in the section under vacuum. Following the vacuum zone, the screw recompresses the melt and continues the dispersion process. It may optionally again pass it through kneading blocks and reverse elements which, if present, also serve as a vacuum seal for this side of the vacuum zone. The melt is then further compressed and mixed as it passes through the end of the extruder and out the die. The die may be designed to form an end use shape directly, i.e., a profile, sheet or parison, or it may produce strand for pelletizing the product. In a machine such as a Baker-Perkins, the melt from the twin-screw mixer will be discharged to a single-screw extruder or other melt pump for pelletizing or shaping. As the product exits the die, it is generally quenched with cold water, air dried, and cut into pellets.

The compounded product will typically be used to injection mold end-use objects. In this process, the product of the invention in pellet form is introduced to the melting zone of a molding machine and converted to a fluid melt under the action of shear, applied heat, and compression. The melt is then transferred (injected) under pressure to a cooler mold and allowed to solidify. The product can also be blow molded, injection-blow-molded, compression molded, and melt cast.

The physical properties of the molded articles may depend on the manner in which they are fabricated. This is known to those skilled in the art of fabricating thermoplastics containing dispersed phases. Processing parameters such as melt temperature, mold temperature, melt flow paths, melt shear rates, mold fill times, and part thickness all influence many of the physical properties of a fabricated object. These parameters must be considered as one selects and optimizes a fabricating process to produce a desired balance of properties.

Tests

Blends of the present invention were prepared and subjected to various tests. Melt index, based on ASTM D1238, measured the melt flow of the polymer at a given temperature calculated over a 10-minute period using a 2160 gram loads.

Tensile tests were all conducted on the Instron, Model 4201, at a temperature of 25° C., using an injection molded dumbbell of dimensions 8½"×½"×½" in accordance with ASTM D638. Tensile tests include tensile modulus, tensile strength at maximum, and tensile elongation at break. Tensile strength at maximum represents the higher value obtained between tensile strength at yield and tensile strength at break, both of which were measured in accordance with ASTM D638.

Notched izod toughness, which represents the force required to break a notched sample, was measured by the notched izod test, ASTM D256, on an injection molded base of dimensions ½"×½"×2½", at the desired temperature. It is noted that, when comparing a blend having a notched izod value greater than 10 to one also having a notched izod value greater than 10, differences are not significant unless the difference between the two izod values is large. For example, a blend with an izod value of 12 is similar in toughness to one with an izod value of 11 or 13 but is not similar in toughness to one with an izod value of 18. Fast tear strength toughness, which represents the force required to tear a sheet that has a slit or crack in it, was measured according to ASTM D470, at a rate of 50"/min. at 25° C. Fast tear strength toughness is correlative, in terms of type of property measured, to notched izod toughness. It was measured when, due to the nature of the sample, it was not possible to measure a notched izod value (i.e., the measurement is off-scale). This occurs, for example, when the test sample is too "soft" to result in a break during the notched izod test.

Flexural properties were measured on the Instron, Model 4201, using an injection molded flexural bar of dimensions 5"×½"×½", at 25° C., a 2" span and a 0.2"/min. crosshead speed, in accordance with ASTM D790. Flexural properties include flexural modulus and flexural strength.

Unless otherwise specified in a particular example, blends were prepared and tested under the conditions described below. Blends were prepared by mixing together the two polymeric components and isocyanate compound at room temperature when TDI was used and at 40°–70° C. when MDI was used. Samples were then subjected to melt blending, which was either done in an extruder or in a mixer. The extruders used either a twin screw or a single screw. The twin screw extruder was of the Werner and Pfleiderer type. It had a trilobal 30 mm. diameter screw, 4 heating zones, and a vacuum port at the third zone, near the exit die. The single screw extruder was of the Sterling type. It had a 1 inch (or 25.7 mm) diameter screw, and three heating zones. The mixer used was called the Haake system 40. It consisted of a chamber, which could hold 70 grams of polymer, and a counter-rotating twin blade for mixing. The machine was operated at 75 RPM for 4 minutes at the desired temperature. The sample was then ground into pellets and dried at 90° C. for 16 hours under vacuum. The exact extrusion or mixing conditions for each sample are listed in Table 1A (for extruded samples) and Table 1B (for the Haake mixed samples), below.

After extrusion or mixing, samples were either injection molded or compression molded. Injection molding was done on a 6-ounce type machine made by HPM Co. The injection cycle was between 15–45/15–30 seconds. The processing temperature at the injection point was 10°–20° C. higher than the melting point of the highest melting component in the blend. Compression molding was done on a "PASADENA" press. It was done by placing the polymer, in pellets or sheet form, on a mold of dimensions 6"×6"×½" at the desired temperature. The mold was then pressed under a load of 10,000 pounds for 1 minute, after which it was quenched to 25° C. by circulating water through the press. The compression molded sheet was then cut into specimens according to ASTM D638 and D470 to measure strength and toughness respectively. The exact molding conditions for each sample are in Table 1C (for injection molded samples) and Table 1D (for compression molded samples).

TABLE 1A

| Sample No. | Extrusion Conditions | | | | | |
|---|---|---|---|---|---|---|
| | Temperature (°C.) of Heating Zone | | | | Die Temp. (°C.) | Vacuum (mm Hg) |
| | 1 | 2 | 3 | 4 | | |
| 1 | 182 | 228 | 224 | 229 | 214 | 30 |
| 2 | 230 | 238 | 237 | 226 | 206 | 30 |
| 3 | 182 | 228 | 223 | 229 | 214 | 30 |
| 4 | 198 | 242 | 245 | 233 | 214 | 28 |
| 5 | 230 | 238 | 237 | 226 | 206 | 30 |
| 6 | 99 | 230 | 230 | 230 | 226 | 30 |
| 7 | 230 | 238 | 237 | 226 | 206 | 30 |
| 8 | 99 | 239 | 241 | 232 | 217 | 30 |
| 9 | 104 | 240 | 243 | 232 | 220 | 30 |
| 10 | 103 | 240 | 238 | 231 | 212 | 28.5 |
| 11 | 202 | 246 | 246 | 241 | 240 | 27 |
| 12 | 202 | 246 | 246 | 241 | 240 | 27 |
| 13 | 204 | 242 | 242 | 238 | 239 | 27 |
| 14 | 98 | 229 | 233 | 235 | 228 | 30 |
| 15 | 99 | 231 | 235 | 233 | 227 | 30 |
| 16 | 186 | 241 | 213 | 207 | 198 | 27.5 |
| 17 | 189 | 240 | 207 | 202 | 198 | 27.5 |
| 18 | 190 | 241 | 205 | 200 | 196 | 27.5 |
| 19 | 190 | 241 | 205 | 200 | 196 | 27.5 |
| 20 | 97 | 240 | 239 | 228 | 221 | 30 |
| 21 | 99 | 241 | 238 | 228 | 218 | 30 |
| 22 | 190 | 240 | 250 | 235 | 227 | 23 |
| 23 | 216 | 270 | 272 | 250 | 239 | 30 |
| 24 | 216 | 273 | 272 | 254 | 239 | 30 |
| 25 | 185 | 281 | 266 | 271 | 263 | 14.8 |
| 25A | 183 | 287 | 205 | 252 | 245 | 17 |
| 25B | 188 | 288 | 254 | 254 | 250 | 17 |
| 26 | 125 | 227 | 225 | 212 | 211 | 30 |
| 27 | 134 | 232 | 209 | 193 | 183 | 30 |
| 28 | 190 | 187 | 189 | 184 | 184 | 0 |
| 29 | 181 | 238 | 217 | 204 | 190 | 30 |
| 30 | 197 | 188 | 190 | 185 | 185 | 0 |
| 31 | 186 | 230 | 208 | 195 | 195 | 30 |
| 32 | 199 | 188 | 190 | 185 | 185 | 0 |
| 33 | 186 | 228 | 213 | 206 | 195 | 30 |
| 34 | 100 | 242 | 236 | 230 | 222 | 29 |
| 35 | 100 | 240 | 240 | 230 | 215 | 29 |
| 36 | 102 | 242 | 237 | 237 | 223 | 29 |
| 37 | 186 | 240 | 205 | 202 | 197 | 27.5 |
| 38 | 186 | 241 | 207 | 200 | 196 | 27.5 |

TABLE 1A

| Sample No. | Extrusion Conditions (continued) | | | | | |
|---|---|---|---|---|---|---|
| | Temperature (°C.) of Heating Zone | | | | Die Temp. (°C.) | Vacuum (mm Hg) |
| | 1 | 2 | 3 | 4 | | |
| 45[(1)] | 225 | 229 | 234 | — | 233 | 0 |

TABLE 1A-continued

| | Extrusion Conditions (continued) | | | | | |
|---|---|---|---|---|---|---|
| Sample No. | Temperature (°C.) of Heating Zone | | | | Die Temp. (°C.) | Vacuum (mm Hg) |
| | 1 | 2 | 3 | 4 | | |
| 46[1] | 223 | 231 | 234 | — | 235 | 0 |
| 47[1] | 230 | 232 | 230 | — | 235 | 0 |
| 48[1] | 235 | 232 | 240 | — | 232 | 0 |
| 49[1] | 230 | 230 | 233 | — | 233 | 0 |
| 50[1] | 228 | 234 | 235 | — | 239 | 0 |
| 51[1] | 224 | 230 | 231 | — | 232 | 0 |
| 52[1] | 226 | 235 | 234 | — | 236 | 0 |
| 53[1] | 235 | 230 | 231 | — | 235 | 0 |
| 54[1] | 231 | 233 | 233 | — | 235 | 0 |
| 55[2] | 197 | 244 | 245 | 240 | 235 | 28.5 |
| 55a[3] | 205 | 247 | 245 | 243 | 215 | 26.6 |
| 55b[4] | 108 | 239 | 237 | 237 | 214 | 26.5 |
| 56 | 198 | 242 | 242 | 240 | 234 | 28.5 |
| 57 | 199 | 242 | 242 | 239 | 238 | 27 |

Legend
[1] Single screw extrusion
[2] Extrusion conditions for blending (PBT + MDI) with (A + MDI)
[3] Extrusion Conditions for blending PBT with MDI
[4] Extrusion Conditions for blending A with MDI

TABLE 1B

| | Mixing Conditions (Haake System) | | |
|---|---|---|---|
| Samples No | Temp. (°C.) | RPM | Time (min.) |
| 39 | 230 | 75 | 4 |
| 40 | 230 | 75 | 4 |
| 41 | 230 | 75 | 4 |
| 42 | 230 | 75 | 4 |
| 43 | 200 | 75 | 4 |
| 44 | 200 | 75 | 4 |

TABLE 1C

| | Conditions for Injection Molding | | | | | |
|---|---|---|---|---|---|---|
| Sample No. | Temperature (°C.) of Heating Zone | | | | Mold Temp. (°C.) | Cycle (sec/sec) |
| | Rear 1 | Center 2 | Front 3 | Nozzle 4 | | |
| 1 | 210 | 235 | 225 | 240 | 40/40 | 20/20 |
| 2 | 210 | 235 | 225 | 240 | 40/40 | 20/20 |
| 3 | 210 | 235 | 225 | 240 | 40/40 | 20/20 |
| 4 | 210 | 235 | 225 | 240 | 40/40 | 20/20 |
| 5 | 210 | 235 | 225 | 240 | 40/40 | 20/20 |
| 6 | 210 | 235 | 225 | 240 | 40/40 | 20/20 |
| 7 | 210 | 235 | 225 | 240 | 40/40 | 20/20 |
| 8 | 210 | 240 | 240 | 240 | 40/40 | 20/20 |
| 9 | 210 | 240 | 240 | 240 | 40/40 | 20/20 |
| 10 | 210 | 240 | 240 | 240 | 40/40 | 20/20 |
| 11 | 243 | 241 | 240 | 240 | 40/40 | 20/15 |
| 12 | 243 | 241 | 240 | 240 | 40/40 | 20/15 |
| 13 | 243 | 241 | 240 | 240 | 40/40 | 20/15 |
| 16 | 239 | 240 | 240 | 238 | 30/30 | 20/30 |
| 17 | 240 | 240 | 240 | 241 | 30/30 | 20/30 |
| 18 | 239 | 240 | 240 | 242 | 30/30 | 20/30 |
| 19 | 240 | 240 | 239 | 241 | 30/30 | 20/30 |
| 23 | 219 | 270 | 250 | 249 | 40/40 | 25/15 |
| 24 | 219 | 270 | 250 | 249 | 40/40 | 25/15 |
| 25 | 260 | 258 | 261 | 260 | 40/40 | 15/20 |
| 25A | 280 | 280 | 288 | 280 | 40/40 | 25/20 |
| 25B | 280 | 280 | 288 | 280 | 40/40 | 25/20 |
| 26 | 200 | 200 | 200 | 200 | 40/40 | 15/20 |
| 27 | 200 | 200 | 200 | 200 | 40/40 | 15/20 |
| 28 | 170 | 185 | 185 | 180 | 40/40 | 45/15 |
| 29 | 190 | 199 | 200 | 200 | 40/40 | 20/20 |
| 30 | 170 | 185 | 185 | 180 | 40/40 | 45/15 |
| 31 | 190 | 199 | 200 | 200 | 40/40 | 20/20 |
| 32 | 170 | 185 | 185 | 180 | 40/40 | 45/15 |
| 33 | 190 | 199 | 200 | 200 | 40/40 | 20/20 |
| 37 | 240 | 240 | 240 | 239 | 30/30 | 20/30 |
| 38 | 240 | 240 | 240 | 241 | 30/30 | 20/30 |
| 45 | 235 | 234 | 235 | 235 | 30/30 | 20/20 |
| 46 | 235 | 235 | 235 | 235 | 30/30 | 20/20 |
| 47 | 236 | 234 | 235 | 235 | 30/30 | 20/20 |
| 48 | 235 | 235 | 235 | 236 | 30/30 | 20/20 |
| 49 | 235 | 235 | 235 | 235 | 30/30 | 20/20 |
| 50 | 235 | 234 | 235 | 236 | 30/30 | 20/20 |
| 51 | 219 | 220 | 220 | 220 | 30/30 | 25/15 |
| 52 | 219 | 221 | 221 | 220 | 30/30 | 25/15 |
| 53 | 220 | 221 | 221 | 220 | 30/30 | 25/15 |
| 54 | 219 | 220 | 221 | 220 | 30/30 | 25/15 |
| 55 | 244 | 240 | 240 | 239 | 40/40 | 25/15 |
| 56 | 238 | 241 | 238 | 240 | 40/40 | 30/15 |
| 57 | 244 | 240 | 239 | 240 | 40/40 | 25/15 |

TABLE 1D

| Conditions for Compression Molding | | |
|---|---|---|
| Sample No. | Temperature (°C.) | Load (lbs) |
| 14 | 230 | 10,000 |
| 15 | 230 | 10,000 |
| 20 | 230 | 10,000 |
| 21 | 230 | 10,000 |
| 22 | 230 | 10,000 |
| 34 | 230 | 10,000 |
| 35 | 230 | 10,000 |
| 36 | 230 | 10,000 |
| 39 | 230 | 10,000 |
| 40 | 230 | 10,000 |
| 41 | 230 | 10,000 |
| 42 | 230 | 10,000 |
| 43 | 200 | 10,000 |
| 44 | 200 | 10,000 |

The "hard" polymers (component (a) thermoplastic polymer), or those with a flexural modulus of greater than 150 kpsi, used in the examples below are described as follows:

(1) PBT, polybutylene terephthalate, was derived from butanediol and terephthalic acid and had a number average molecular weight range of 20,000–25,000. The flexural modulus was approximately 300 kpsi;

(2) PET, polyethylene terephthalate, was a polymer made from ethylene glycol and terephthalic acid. It had a number average molecular weight in the range of 22,000 to 25,000 and an approximate flexural modulus of 350 kpsi;

(3) PA, polyacetal, was homopolymer of polyacetal end-capped with acetate. It had an approximate number average molecular weight of 65,000 and an approximate flexural modulus of 400 kpsi; and (4) N6,6, nylon 6,6, was prepared from adipic acid and hexamethylene diamine by conventional methods. It had an approximate number average molecular weight of 18,000 and a flexural modulus in the range of 350 to 400 kpsi, dry as molded.

The "soft" polymers (component (b) at least one thermoplastic polymer), or those with a flexural modulus of less than 150 kpsi, used in the examples below are as follows:

Polymers A through I were all copolyetheresters. Except for A, in each case antioxidant was a 50/50 mix of N,N'-hexamethylene-bis(3,5-di-tert-butyl-4-hydroxyhydrocinnamamide)/N,N'-trimethylene-bis(3,5-di-tert-butyl-4-hydroxyhydrocinnamamide). The copolyetheresters used are as follows:

(1) A was derived from 30.28 wt % dimethyl terephthalate, 8.76 wt % dimethyl isophthalate, 32.74 wt % polypropylene glycol (number average molecular weight 2,000), 27.67 wt % butanediol, 0.23 wt % tetrabutylene titanate, 0.25 wt % N,N'-hexamethylene-bis(3,5-di-tert-butyl-4-hydroxyhydrocinnamamide), and 0.07 wt % trimethyltrimellitate. The flexural modulus of A was 8-10 kpsi;

(2) B was derived from 31.86 wt % dimethyl terephthalate, 9.24 wt % dimethyl isophthalate, 35.3 wt % polytetramethylene glycol (number average molecular weight 1000), 23.1 wt % butanediol, 0.16 wt % tetrabutylene titanate, 0.24 wt % antioxidant, and 0.052 wt % trimethyltrimellitate. The flexural modulus of B was 8-10 kpsi;

(3) C was derived from 21.84 wt % dimethyl terephthalate, 66.96 wt % polytetramethylene glycol (number average molecular weight 2100), 10.67 wt % butanediol, 0.21 wt % tetrabutylene titanate, 0.25 wt % antioxidant, and 0.057 wt % trimethyltrimellitate. The flexural modulus of C was 3-6 kpsi;

(4) D was derived from 37.28 wt % dimethyl terephthalate, 40.16 wt % polytetramethylene glycol (number average molecular weight 1400), 22.06 wt % butanediol, 0.22 wt % tetrabutylene titanate, 0.22 wt % antioxidant, and 0.05 wt % trimethyltrimellitate. The flexural modulus of D was 35-40 kpsi;

(5) E was derived from 41.53 wt % dimethyl terephthalate, 33.63 wt % polytetramethylene glycol (number average molecular weight 1000), 24.34 wt % butanediol, 0.22 wt % tetrabutylene titanate, 0.22 wt % antioxidant, and 0.05 wt % trimethyltrimellitate. The flexural modulus of E was 35-40 kpsi;

(6) F was derived from 52.94 wt % dimethyl terephthalate, 11.29 wt % polytetramethylene glycol (number average molecular weight 1000), 35.29 wt % butanediol, 0.21 wt % tetrabutylene titanate, 0.21 wt % antioxidant, and 0.04 wt % trimethyltrimellitate. The flexural modulus of F was approximately 80 kpsi;

(7) G was derived from 45.01 wt % dimethyl terephthalate, 26.82 wt % polytetramethylene glycol (number average molecular weight 1000), 27.66 wt % butanediol, 0.22 wt % tetrabutylene titanate, 0.22 wt % antioxidant, and 0.04 wt % trimethyltrimellitate. The flexural modulus of G was approximately 55 kpsi.

(8) H was derived from 24.03 wt % dimethyl terephthalate, 62.75 wt % polytetramethylene glycol (number average molecular weight 2100), 12.73 wt % butanediol, 0.24 wt % tetrabutylene titanate, 0.22 wt % antioxidant, and 0.057 wt % trimethyltrimellitate. The flexural modulus of H was 6-7 kpsi;

(9) I was derived from 26.58 wt % dimethyl terephthalate, 58.18 wt % polytetramethylene glycol (number average molecular weight 2100), 14.77 wt % butanediol, 0.21 wt % tetrabutylene titanate, 0.21 wt % antioxidant, and 0.057 trimethyltrimellitate. The flexural modulus of I was 4-7 kpsi:

(10) J, a polyesterimide, was derived from 18.04 wt % diacid of trimellitic anhydride and p-phenylene diamine, 18 wt % butanediol, 18 wt % ethylene glycol, 44.39 wt % adipic acid, 0.04 wt % antimony trioxide, which was the catalyst, and 1.44 wt % 1,3,5-trimethyl-2,4,6-tris(3,5-di-tert-butene-4-hydroxy-benzyl) benzene. The flexural modulus of J was 8-10 kpsi; and

(11) K, an ethylene copolymer, was comprised of 64.5 wt % ethylene, 31 wt % butyl acrylate, and 4.5 wt % glycidyl methacrylate. The flexural modulus of K was 2-3 kpsi.

The reacting agents used in the examples below are as follows:

(1) MDI, methylenediphenylene di-isocyanate;

(2) TDI, a mixture of approximately 10 weight percent 2,6-toluene di-isocyanate and 90 weight percent 2,4-toluene di-isocyanate;

EXAMPLE A

Example A concerns various blends of PBT with Polymer A, a copolyetherester. The data for Example A, compiled in Tables 2A and 2B, illustrates the beneficial effects that are obtained when reacting agent is employed. In Table 2A, stiffness, strength, and toughness are all increased, with toughness being increased most dramatically, when reacting agent is used. Table 2B shows that strength and toughness are increased when reacting agent is used.

In Sample Nos. 2 and 5, 0.1 wt % zinc acetate (based on the weight of PBT and Polymer A) was included in the samples. These are the only samples that include zinc acetate. The zinc acetate is not believed to affect stiffness, strength, and toughness properties. This belief is based on a comparison of Sample 5, where zinc acetate was used, with Sample 56, where no zinc acetate was used.

EXAMPLE A

Blends of PBT with a Copolyetherester (A)

TABLE 2A

|  | Sample No. | | | | |
| --- | --- | --- | --- | --- | --- |
|  | 1 | 2* | 3 | 4 | 5* |
| Wt. % PBT | 80 | 80 | 65 | 65 | 65 |
| Wt. % Polymer A | 20 | 20 | 35 | 35 | 35 |
| Wt. % Reacting Agent | 1.4 TDI | 0.0 | 1.3 TDI | 1 MDI | 0.0 |
| Stiffness | | | | | |
| Tensile Modulus (kpsi) | 260 | 210 | 190 | 170 | 145 |
| Strength | | | | | |
| Tensile Strength @ Maximum (kpsi) | 6.8 | 4.1 | 5.6 | 5.7 | 3.3 |
| Toughness | | | | | |
| Tensile Elongation @ Break (%) | 425 | 150 | 430 | 425 | 140 |
| Notched Izod (ft-lb/in @ 25° C.) | 1.73 | 1.3 | 15 | 17 | 1.4 |
| Melt Index @ 240° C. (gr/10 min.) | 5.1 | 57 | 4.9 | 2.3 | 79 |

Legend
* = also contains 0.1 wt % zinc acetate

TABLE 2B

|  | Sample No. | |
| --- | --- | --- |
|  | 6 | 7 |
| Wt % PBT | 50 | 50 |
| Wt % Polymer A | 50 | 50 |
| Wt % Reacting Agent | 0.5 TDI | 0.0 |
| Strength | | |
| Tensile Strength @ Maximum (kpsi) | 3.7 | 3.1 |
| Toughness | | |
| Tensile Elongation @ Break (%) | 480 | 210 |

EXAMPLE B

Example B concerns various blends of PBT with Polymer J, a polyesterimide. The data for Example B, compiled in Table 3, show that strength is increased when reacting agent is used. Toughness, as measured by notched izod and fast tear strength, is also increased when reacting agent is used.

EXAMPLE B

Blends of PBT with a Polyesterimide (J)

TABLE 3

|  | Sample No | | |
|---|---|---|---|
|  | 8 | 9 | 10 |
| Wt. % PBT | 80 | 80 | 65 |
| Wt % Polymer J | 20 | 20 | 35 |
| Wt % TDI | 0.0 | 0.7 | 0.7 |
| Strength | | | |
| Tensile Strength @ Maximum (kpsi) | 4.8 | 5.2 | 4.5 |
| Toughness | | | |
| Tensile Elongation @ Break (%) | 360 | 160 | 340 |
| Notched Izod (ft-lb/in @ 25° C.) | 1.3 | 2.1 | 19.7 |
| Fast Tear Strength (pli @ 25° C.) | 570 | 700 | 800 |
| Melt Index @ 240° C. (gr/10 min.) | 6.3 | 0.5 | 0.9 |

EXAMPLE C

Example C concerns various blends of PBT with Polymer K, an ethylene copolymer. The data for Example C, compiled in Table 4, show that strength and stiffness properties are maintained when reacting agent is used while toughness, at lower temperatures, is improved. Samples 12 and 13 were prepared by adding the MDI to an already melt blended composition (Sample 11). This procedure is in contrast to the previous examples where the polymers and isocyanate reacting agent were all blended together simultaneously. The example illustrates that the isocyanate reacting agent can be added at any stage of blending as long as the incompatible polymers are present together when the isocyanate reacting agent is added.

EXAMPLE C

Blends of PBT with an Ethylene Copolymer (K)

TABLE 4

|  | Sample No. | | |
|---|---|---|---|
|  | 11 | 12 | 13 |
| Wt % PBT | 80 | 80 | 80 |
| Wt % Polymer K | 20 | 20 | 20 |
| Wt % MDI | 0.0 | 0.7 | 1.0 |
| Stiffness | | | |
| Tensile Modulus (kpsi) | 150 | 210 | 150 |
| Flexural Modulus (kpsi) | 190 | 200 | 195 |
| Strength | | | |
| Tensile Strength @ Maximum (kpsi) | 4.2 | 4.3 | 4.5 |
| Flexural Strength (kpsi) | 6.8 | 6.7 | 7.0 |
| Toughness | | | |
| Tensile Elongation @ Break (%) | 87 | 88 | 123 |
| Notched Izod | | | |
| (ft-lb/in @ 25° C.) | 20 | 20 | 20 |
| (ft-lb/in @ −20.C.) | 10 | 19 | 18 |
| (ft-lb/in @ −40.C.) | 1.2 | 1.7 | 1.7 |
| Melt Index @ 240° C. (gr/10 min.) | 0.6 | 0.4 | 0.1 |

EXAMPLE D

Example D concerns various blends of PBT with various copolyetheresters. The data is compiled in Tables 5A, 5B, and 5C. The data in Table 5A show that toughness is increased when reacting agent is used while strength is maintained. The data in Table 5B show that toughness is increased when reacting agent is used while strength and stiffness are maintained. The data in Table 5C show the strength and toughness values that are attained at low concentrations of PBT when reacting agent is used.

EXAMPLE D

Blends of PBT with Various Copolyetheresters

TABLE 5A

|  | Sample No. | |
|---|---|---|
|  | 14 | 15 |
| Wt. % PBT | 60 | 60 |
| Wt. % Polymer B | 40 | 40 |
| Wt. % TDI | 0.0 | 0.6 |
| Strength | | |
| Tensile Strength @ Maximum (kpsi) | 4.1 | 4.4 |
| Toughness | | |
| Tensile Elongation @ Break (%) | 100 | 450 |
| Fast Tear Strength (pli @ 25° C.) | 425 | 525 |
| Melt Index @ 240° C. (gr/10 min.) | 12.5 | 6.6 |

TABLE 5B

|  | Sample No. | | | |
|---|---|---|---|---|
|  | 16 | 17 | 18 | 19 |
| Wt. % PBT | 65 | 65 | 65 | 65 |
| Wt. % Copolyetherester | 35C | 35C | 35I | 35I |
| Wt. % TDI | 0.0 | 0.9 | 0.0 | 0.9 |
| Stiffness | | | | |
| Tensile Modulus (kpsi) | 150 | 145 | 150 | 145 |
| Flexural Modulus (kpsi) | 165 | 170 | 172 | 170 |
| Strength | | | | |
| Tensile Strength @ Maximum (kpsi) | 3.3 | 5.2 | 5.2 | 5.3 |
| Flexural Strength (kpsi) | 5 | 5.2 | 5.9 | 5.6 |
| Toughness | | | | |
| Tensile Elongation @ Break (%) | 190 | 500 | 550 | 480 |
| Notched Izod | | | | |
| (ft-lb/in @ 25° C.) | 13 | 14 | 14.4 | 15.6 |
| (ft-lb/in @ 0° C.) | 4.5 | 15 | 4.1 | 16.0 |
| Melt Index @ x° C. (gr/10 min) | 7.3 (240° C.) | 2.7 (240° C.) | 5.9 (230° C.) | 2.8 (230° C.) |

TABLE 5C

|  | Sample No. | | |
|---|---|---|---|
|  | 20 | 21 | 22 |
| Wt. % PBT | 20 | 16 | 7 |
| Wt. % Polymer 2 | 80D | 84D | 93E |
| Wt. % TDI | 0.5 | 0.5 | 0.8 |
| Strength | | | |
| Tensile Strength @ Maximum (kpsi) | 5.3 | 3.3 | 5 |
| Toughness | | | |
| Tensile Elongation @ Break (%) | 560 | 590 | 780 |
| Fast Tear Strength | | | |
| (pli @ 25° C.) | 200 | 174 | 300 |
| (pli @ 125° C.) | 111 | 40 | N/A |
| Melt Index @ x° C. | 0.5/240 | 2.7/240 | 4.6/230 |

EXAMPLE E

Example E concerns blends of PET with Polymer A, a copolyetherester. The data for Example E is compiled in Table 6. Comparing Sample 23 with Sample 24, it is seen that toughness is increased with the use of the reacting agent while strength and stiffness properties are maintained.

EXAMPLE E

Blends of PET with Copolyetherester (A)

TABLE 6

| | Sample | |
|---|---|---|
| | 23 | 24 |
| Wt % PET | 80 | 80 |
| Wt % Polymer A | 20 | 20 |
| Wt % TDI | 0.0 | 2 |
| Stiffness | | |
| Tensile Modulus (kpsi) | 300 | 300 |
| Strength | | |
| Tensile Strength @ Maximum (kpsi) | 7.2 | 7.9 |
| Toughness | | |
| Notched Izod | | |
| (ft-lb/in @ 25° C.) | 0.8 | 1.5 |
| (ft-lb/in @ x° C.) | 0.6 | 1.3 |
| Tensile Elongation @ Break (%) | 290 | 300 |
| Melt Index @ 270° C. (gr/10 min.) | 44 | 5.9 |

EXAMPLE F

Example F concerns blends of Nylon 6,6 with copolyetheresters. The data for Example F, compiled in Table 7, shows that toughness is increased when reacting agent is used while strength and stiffness are maintained.

EXAMPLE F

Blends of Nylon 6,6 with Copolyetheresters

TABLE 7

| | Sample No. | | |
|---|---|---|---|
| | 25 | 25A | 25B |
| Wt % Nylon 6,6 | 16 | 70 | 70 |
| Wt % Polymer 2 | 93E | 30B | 30B |
| Wt % TDI | 0.8 | 0 | 0.6 |
| Stiffness | | | |
| Tensile Modulus (kpsi) | N/A | 310 | 310 |
| Strength | | | |
| Tensile Strength @ Maximum (kpsi) | 2.5 | 6.9 | 7.2 |
| Toughness | | | |
| Tensile Elongation @ Break (%) | 400 | 14 | 18 |
| Notched Izod | | | |
| (ft-lb/in @ 25° C.) | N/A | 1.2 | 2.1 |
| (ft-lb/in @ x° C.) | 16(−40° C.) | 1.2 | 2.0 |
| Fast Tear Strength (pli @ 25° C.) | 110 | N/A | N/A |
| Melt Index @ x° C. (gr/10 min) | 4.8/240 | 29/280 | 2.3/280 |

Legend
N/A = not available

EXAMPLE G

Example G concerns various blends of polyacetal, PA, with Polymer B, a copolyetherester, or Polymer J, a polyesterimide. The data for Example G is compiled in Tables 8A and 8B. The data in Table 8A, representing blends of PA with Polymer B, shows that stiffness and strength properties are maintained when reacting agent is used while toughness is increased. The data in Table 8B, representing blends of PA with Polymer J, show that strength is maintained when reacting agent is used while toughness is increased.

EXAMPLE G

Blends of Polyacetal (PA) with Copolyetherester (B) or Polyesterimide (J)

TABLE 8A

| | Sample | |
|---|---|---|
| | 26 | 27 |
| Wt % PA | 70 | 70 |
| Wt % Polymer B | 30B | 30B |
| Wt % TDI | 0.0 | 0.6 |
| Stiffness | | |
| Tensile Modulus (kpsi) | 200 | 240 |
| Flexural Modulus (kpsi) | 200 | 200 |
| Strength | | |
| Tensile Strength @ Maximum (kpsi) | 6.3 | 6.6 |
| Flexural Strength (kpsi) | 7.8 | 8.3 |
| Toughness | | |
| Tensile Elongation @ Break (%) | 40 | 76 |
| Notched Izod | | |
| (ft-lb/in @ 25° C.) | 1.5 | 2.9 |
| (ft-lb/in @ −30° C.) | 1.3 | 2.2 |
| Melt Index @ 200° C. (gr/10 min) | 4 | 2 |

TABLE 8B

| | Sample | | | | | |
|---|---|---|---|---|---|---|
| | 28 | 29 | 30 | 31 | 32 | 33 |
| Wt % PA | 75 | 75 | 70 | 70 | 65 | 65 |
| Wt % Polymer J | 25 | 25 | 30 | 30 | 35 | 35 |
| Wt % TDI | 0.0 | 0.8 | 0.0 | 0.8 | 0.0 | 0.8 |
| Strength | | | | | | |
| Tensile Strength @ Maximum (kpsi) | 6.9 | 7 | 6.5 | 6.9 | 5.7 | 6.5 |
| Toughness | | | | | | |
| Tensile Elongation @ Break (%) | 43 | 70 | 53 | 80 | 70 | 86 |
| Notched Izod (ft-lb/in @ 25° C.) | 0.6 | 2.1 | 0.7 | 2.5 | 0.8 | 4 |

EXAMPLE H

Example H concerns blends where the polymeric components are both thermoplastic elastomers; that is, both polymers have a flexural modulus less than 150 kpsi. The data for Example H is compiled in Tables 9A and 9B. Sample Nos. 34, 35, and 36 show the property values that are obtained when reacting agent is added to a blend of two elastomeric polymers. Sample Nos. 37 and 38 show that toughness, at low temperature, is increased when reacting agent is used while strength and stiffness are maintained. The data in Table 9B show that, for Sample Nos. 39-40, toughness is increased when reacting agent is used while strength is maintained. For Sample Nos. 41-44, strength is increased when reacting agent is used while toughness is maintained.

EXAMPLE H

Blends of Two Copolyetheresters

TABLE 9A

|  | Sample | | | | |
| --- | --- | --- | --- | --- | --- |
|  | 34 | 35 | 36 | 37 | 38 |
| Wt % Polymer 1 | 70A | 60A | 50A | 70F | 70F |
| Wt % Polymer 2 | 30F | 40F | 50F | 30H | 30H |
| Wt % TDI | 0.8 | 0.8 | 0.8 | 0 | 0.8 |
| Stiffness |  |  |  |  |  |
| Flexural Modulus (kpsi) | N/A | N/A | N/A | 48 | 48 |
| Strength |  |  |  |  |  |
| Tensile Strength @ Maximum (kpsi) | 4.7 | 4.5 | 5.4 | 3.9 | 3.9 |
| Flexural Strength (kpsi) | N/A | N/A | N/A | 2.2 | 2.2 |
| Toughness |  |  |  |  |  |
| Tensile Elongation @ Break (%) | 650 | 570 | 590 | 480 | 420 |
| Notched Izod |  |  |  |  |  |
| (ft-lb/in @ 25° C.) | N/A | N/A | N/A | 14 | 13 |
| (ft-lb/in @ −10° C.) | N/A | N/A | N/A | 4.5 | 17 |
| Melt Index @ 230° C. (gr/10 min) | 2.8 | 2.8 | 2.8 | 8.6 | 3.1 |

Legend
N/A = not available

TABLE 9B

|  | Sample No. | | | | | |
| --- | --- | --- | --- | --- | --- | --- |
|  | 39 | 40 | 41 | 42 | 43 | 44 |
| Wt % Polymer 1 | 50F | 50F | 50G | 50G | 50B | 50B |
| Wt % Polymer H | 50 | 50 | 50 | 50 | 50 | 50 |
| Wt % TDI | 0 | 1.0 | 0 | 1.0 | 0 | 1.0 |
| Strength |  |  |  |  |  |  |
| Tensile Strength @ Maximum (kpsi) | 3.0 | 3.5 | 2.4 | 3.8 | 2.1 | 3.2 |
| Toughness |  |  |  |  |  |  |
| Tensile Elongation @ Break (%) | 240 | 600 | 670 | 700 | 890 | 800 |
| Fast Tear Strength (pli @ 25° C.) | 365 | 575 | 270 | 270 | 235 | 253 |
| Slow Tear Strength (pli @ 25° C.) | 350 | 460 | 240 | 500 | 400 | 400 |
| Melt Index (gr/10 min) |  |  |  |  |  |  |
| @ 230° C. | 8.5 | 0.3 | 7.6 | 0.5 | N/A | N/A |
| @ 210° C. | N/A | N/A | N/A | N/A | 3.4 | 0.8 |

Legend
N/A = not available

EXAMPLE I

Example I concerns blends of the present invention with glass fibers. Blends were prepared in the usual manner, i.e., the polymers and reacting agent were melt blended in a twin screw extruder and then pelletized. Glass fiber was then added to the pellets and the mixture was melt blended in a single screw extruder and pelletized. The pellets were then injection molded to form test bars. The data for Example I, show the property values that are obtained when glass fibers are added to the blend. Table 10A concerns glass fiber reinforced blends of PBT and copolyetheresters while Table 10B concerns glass fiber reinforced blends of two copolyetheresters.

EXAMPLE I

Class Fiber Reinforced Blends of PBT/Copolyetherester and Glass Reinforced Blends of Two Copolyetheresters

TABLE 10A

|  | Sample No. | | | | | |
| --- | --- | --- | --- | --- | --- | --- |
|  | 45 | 46 | 47 | 48 | 49 | 50 |
| Wt % PBT | 55 | 55 | 55 | 55 | 52 | 52 |
| Wt % Copolyetherester | 30C | 30C | 30J | 30J | 28J | 28J |
| Wt % Glass Fiber | 15 | 15 | 15 | 15 | 20 | 20 |
| Wt % TDI | 0 | 0.76 | 0 | 0.76 | 0.72 |  |
| Stiffness |  |  |  |  |  |  |
| Tensile Modulus (kpsi) | 390 | 360 | 440 | 390 | 465 | 495 |
| Flexural Modulus (kpsi) | 300 | 290 | 330 | 305 | 400 | 377 |
| Strength |  |  |  |  |  |  |
| Tensile Strength @ Break (kpsi) | 6.8 | 6.5 | 5.5 | 7.6 | 5 | 6.9 |
| Flexural Strength (kpsi) | 9.6 | 8.6 | 10.5 | 9.5 | 11.1 | 11 |
| Toughness |  |  |  |  |  |  |
| Tensile Elongation @ Break (kpsi) | 5.7 | 6.7 | 5.5 | 7.6 | 5 | 6.9 |
| Notched Izod |  |  |  |  |  |  |
| (ft-lb/in @ 25° C.) | 4.8 | 5.4 | 4.5 | 5.8 | 4.4 | 5.7 |
| (ft-lb/in @ −30° C.) | 2.2 | 2.5 | 2.1 | 2.7 | 2.3 | 2.9 |

TABLE 10B

|  | Sample No. | | | |
| --- | --- | --- | --- | --- |
|  | 51 | 52 | 53 | 54 |
| Wt % Copolyetherester 1 | 56F | 56F | 59.5F | 59.5F |
| Wt % Copolyetherester 2 | 30I | 30I | 25.5I | 25.5I |
| Wt % Glass Fiber | 20 | 20 | 15 | 15 |
| Wt % TDI | 0 | 0.72 | 0 | 0.76 |
| Stiffness |  |  |  |  |
| Tensile Modulus (kpsi) | 510 | 470 | 410 | 373 |
| Flexural Modulus (kpsi) | 416 | 378 | 345 | 267 |
| Toughness |  |  |  |  |
| Tensile Elongation @ Break (kpsi) | 5.8 | 7.6 | 6.4 | 9.3 |
| Notched Izod |  |  |  |  |
| (ft-lb/in @ 25° C.) | 4.4 | 5.2 | 4.7 | 5.8 |
| (ft-lb/in @ −30° C.) | 2.4 | 2.7 | 2.4 | 2.6 |

EXAMPLE J

Example J concerns blends of PBT and Polymer A, a copolyetherester, that have been prepared by different procedures. Sample 55 was prepared by separately melt blending the individual polymeric components with the reacting agent. Those melt blends (i.e., polymeric component plus reacting agent) were then melt blended together, without any additional reacting agent, injection molded and then subjected to testing. Sample 56 was prepared by melt blending the two polymers (PBT and Polymer A) together. Sample 57 was prepared by melt blending Sample 56 with the reacting agent. The results are compiled in Table 11.

EXAMPLE J

Blends of PBT with Copolyetherester (A) Variation of Mixing Conditions

TABLE 11

| | Sample No. | | |
|---|---|---|---|
| | 55 | 56 | 57 |
| Polymer 1 | PBT + 1% MDI | PBT | PBT |
| Polymer 2 | A + 1% MDI | A | A |
| Ratio 1:2 | 65:35 | 65:35 | 65:35 |
| Wt % Reacting Agent | — | 0.0 | 1 MDI |
| Stiffness | | | |
| Tensile Modulus (kpsi) | 165 | 160 | 160 |
| Flexural Modulus (kpsi) | 190 | 160 | 160 |
| Strength | | | |
| Tensile Strength @ Maximum (kpsi) | 4.4 | 4.2 | 4.1 |
| Flexural Strength (kpsi) | 6.5 | 6.2 | 6.2 |
| Toughness | | | |
| Tensile Elongation @ Break (kpsi) | 128 | 107 | 140 |
| Notched Izod (ft-lb/in @ 25° C.) | 1.7–1.9 | 1.4–1.6 | 14 |
| Melt Index @ 240° C. (gr/10 min) | 4.4 | 11.5 | 1.4 |

A comparison of Sample 55 to Samples 56 and 57 shows that, although the number average molecular weight of Sample 55 is closer to the number average molecular weight of Sample 57, as evidenced by the melt index values, the toughness value, as measured by izod, is closer to Sample 56 (1.4–1.6 ft-lb/in), where no reacting agent is used, than to Sample 57 (14 ft-lb/in), where an identical amount of reacting agent is used. Likewise, a comparison of Sample 55 to Samples 4 and 5 of Table 2A shows that the izod value of Sample 55 (1.7–1.9 ft-lb/in) is closer to that of Sample 5 (1.4 ft-lb/in), where no reacting agent is used, than to that of Sample 4 (17 ft-lb/in), where an identical amount of reacting agent is used. These comparisons show that the order of mixing of components is an important parameter in achieving high Izod values (or good toughness).

I claim:

1. A composition consisting essentially of
   (a) 0–95 weight percent of at least one thermoplastic polymer with a minimum number average molecular weight of 10,000 and a flexural modulus of greater than 150 kpsi, which has at least one functional group capable of reacting with an isocyanate group or which is end-capped with groups that can be removed between the melting point or glass transition temperature of the thermoplastic polymer and the decomposition point of the thermoplastic polymer to expose said at least one functional group;
   (b) 100–5 weight percent of at least one thermoplastic polymer selected from the group consisting of polyesters and ethylene copolymers, wherein the thermoplastic polymer has a minimum number average molecular weight of 10,000, a flexural modulus of less than 150 kpsi, and at least one functional group capable of reacting with an isocyanate group or is end-capped with groups that can be removed between the melting point or glass transition temperature of the thermoplastic polymer and the decomposition point of the thermoplastic polymer to expose said at least one functional group, and wherein the ethylene copolymer is of the formula E/X/Y where
   E is the radical formed from ethylene and E comprises 40–90 weight percent of the ethylene copolymer,
   X is the radical formed from

where $R_1$ is an alkyl group with 2–8 carbon atoms and $R_2$ is a hydrogen, methyl, or ethyl group and X comprises 10–40 weight percent of the ethylene copolymer, and
   Y is selected from the group consisting of glycidyl methacrylate and glycidyl acrylate and
   Y comprises 0.5–20 weight percent of the ethylene copolymer,
   and provided that when component (b) is present at greater than 95%, component (b) consists of at least two polymers that are incompatible with each other; and
   (c) 0.3–5 weight percent, based upon the weight of (a) and (b) above, of at least one isocyanate reacting agent with functionality less than three;
provided that in a blend of component (a) with component (b), component (a) and (b) are incompatible with each other, and further provided that in all blends, there be at least 5 weight percent of component (a) or component (b) that is incompatible with at least one other polymer in the blend.

2. The composition of claim 1 wherein the at least one functional group is selected from the group consisting of hydroxy, anhydride, carboxy, epoxy, amino, and thiol.

3. The composition of claim 2 wherein the at least one functional group is selected from the group consisting of hydroxy, anhydride, carboxy, epoxy, and amino.

4. The composition of claim 1 wherein component (a) comprises 5–95 weight percent of the composition and component (b) comprises 95–5 weight percent of the composition.

5. The composition of claim 1 wherein component (a) comprises 50–90 weight percent of the composition and component (b) comprises 50–10 weight percent of the composition.

6. The composition of claim 1 wherein component (a) comprises 65–80 weight percent of the composition and component (b) comprises 35–20 weight percent of the composition.

7. The composition of claim 1 wherein the at least one isocyanate reacting agent is present at 0.5–3 weight percent, based on the total weight of components (a) and (b).

8. The composition of claim 7 wherein the at least one isocyanate reacting agent is present at 0.75–2 weight percent, based on the total weight of component (a) and (b).

9. The composition of claim 1 wherein component (a) thermoplastic polymer is selected from the group consisting of polyalkylene terephthalate, polyacetal, and polyamide.

10. The composition of claim 9 wherein component (a) thermoplastic polymer is a polyalkylene terephthalate.

11. The composition of claim 10 wherein the polyalkylene terephthalate is polyethylene terephthalate or polybutylene terephthalate.

12. The composition of claim 10 wherein the polyalkylene terephthalate has a number average molecular weight of 20,000-25,000.

13. The composition of claim 9 wherein component (a) thermoplastic polymer is polyacetal.

14. The composition of claim 13 wherein polyacetal is a homopolymer.

15. The composition of claim 13 wherein the polyacetal has a number average molecular weight of 20,000-100,000.

16. The composition of claim 13 wherein the polyacetal has a number average molecular weight of 30,000-80,000.

17. The composition of claim 14 wherein the polyacetal is acetal homopolymer end-capped with acetate.

18. The composition of claim 9 wherein component (a) thermoplastic polymer is polyamide.

19. The composition of claim 18 wherein the polyamide is derived from the reaction of a saturated dicarboxylic acid containing 4-12 carbon atoms with a diamine containing 4-14 carbon atoms.

20. The composition of claim 18 where the polyamide is selected from the group consisting of polyhexamethylene adipamide, polyhexamethylene azelaamide, polyhexamethylene sebacamide, polyhexamethylene dodecanoamide, polycaprolactam, poly(lauric lactam), poly-11-amino-undecanoic acid, and bis(paraaminocyclohexyl) methane dodecanoamide.

21. The composition of claim 18 wherein the polyamide is produced by the ring opening of lactams.

22. The composition of claim 20 wherein the polyamide is polyhexamethylene adipamide.

23. The composition of claim 20 wherein the polyamide is polycaprolactam.

24. The composition of claim 1 wherein component (a) has a flexural modulus of greater than 200 kpsi.

25. The composition of claim 1 wherein component (a) has a flexural modulus of greater than 250 kpsi.

26. The composition of claim 1 wherein component (b) has a flexural modulus of less than 100 kpsi.

27. The composition of claim 1 wherein component (b) is a polyester.

28. The composition of claim 27 wherein the polyester is a copolyetherester consisting essentially of a multiplicity of recurring long chain ester units and short chain ester units joined head-to-head through ester linkages, said long chain ester units being represented by the formula

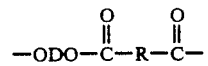

and said short chain ester units being represented by the formula

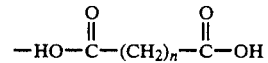

where G is a divalent radical remaining after the removal of terminal hydroxyl groups from a poly(alkylene oxide) glycol having a number average molecular weight of greater than 400 and a carbon to oxygen atomic ratio of about 2.0-4.3, R is a divalent radical remaining after removal of carboxyl groups from an aromatic dicarboxylic acid having a number average molecular weight of less than about 300, and D is a divalent radical remaining after removal of hydroxyl groups from a diol having a number average molecular weight less than about 250; provided said short chain ester units amount to about 15-95 percent by weight of said copolyetherester.

29. The composition of claim 28 wherein said short chain ester units amount to 20-75 percent by weight of said copolyetherester.

30. The composition of claim 27 wherein the polyester is a polyesterimide consisting essentially of
  (a) from 10 to 30 weight percent of an imide acid of the following repeating structure

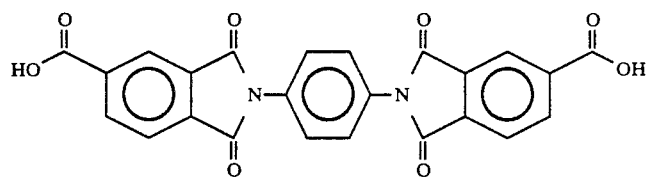

and (b) 70 to 90 weight percent of a diacid/alcohol unit, said unit comprised of
  (1) a diacid of the structure

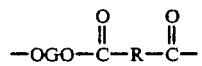

where n is greater than 2 but less than 10
and (2) alcohols selected from the following group:
  (a) diethylene glycol,
  (b) 1,4-butanediol; 1,6-hexanediol, and
  (c) ethylene glycol the total number of moles of alcohols is equal to the number of moles of imide acid plus the number of moles of diacid; provided that, with respect to the diacid/alcohol unit, of the 70 to 90 weight percent attributable solely to alcohol units, diethylene glycol comprises 0-90 weight percent, 1,4-butanediol or 1,6-hexanediol comprises 0-60 weight percent, and ethylene glycol comprises 10-80 weight percent of said unit.

31. The composition of claim 30 wherein the imide acid is present at 15-25 weight percent and the diacid/alcohol unit is present at 75-85 weight percent, said weight percents based on total weight of the composition.

32. The composition of claim 31 wherein the diacid contains greater than 2 but less than 9 methyl groups.

33. The composition of claim 1 wherein component (b) at least one thermoplastic polymer is an ethylene copolymer of the formula E/X/Y where
  E is the radical formed from ethylene and E comprises 40-90 weight percent of the ethylene copolymer, X is the radical formed from

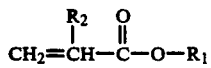

where $R_1$ is an alkyl group with 2-8 carbon atoms and $R_2$ is a hydrogen, methyl, or ethyl group and X comprises 10-40 weight percent of the ethylene copolymer, and Y is selected from the group consisting of glycidyl methacrylate and glycidyl acrylate and Y comprises 0.5-20 weight percent of the ethylene copolymer.

34. The composition of claim 33 wherein $R_2$ of component X is a hydrogen.

35. The composition of claim 33 wherein X comprises 15-35 weight percent of the ethylene copolymer and Y comprises 2.0-10 weight percent of the ethylene copolymer.

36. The composition of claim 33 wherein X comprises 20-35 weight percent of the ethylene copolymer and Y comprises 1-6 weight percent of the ethylene copolymer.

37. The composition of claim 1 wherein the at least one isocyanate reacting agent is derived from a precursor of isocyanate that at processing temperature during melt blending is converted into an isocyanate of functionality less than three.

38. The composition of claim 1 wherein the isocyanate is selected from the group consisting of methylenediphenylene di-isocyanate, 2,4-toluene di-isocyanate, 2,6-toluene di-isocyanate, isophorone, aliphatic di-isocyanate derived from $C_1$-$C_{12}$ and napthalene di-isocyanate.

39. The composition of claim 38 wherein isocyanate is methylenediphenylene di-isocyanate.

40. The composition of claim 38 wherein the isocyanate is selected from 2,4-toluene di-isocyanate and 2,6-toluene di-isocyanate.

* * * * *